United States Patent [19]

Kobayashi

[11] Patent Number: 4,793,242
[45] Date of Patent: Dec. 27, 1988

[54] BRAKE BOOSTER WITH A SEAL AND GUIDE UNIT

[75] Inventor: Michio Kobayashi, Higashimatsuyama, Japan

[73] Assignee: Jidosha Kiki Co., Ltd., Tokyo, Japan

[21] Appl. No.: 118,191

[22] Filed: Nov. 6, 1987

[30] Foreign Application Priority Data

Nov. 10, 1986 [JP] Japan .................. 61-172174[U]

[51] Int. Cl.⁴ .................... F16J 15/18; F15B 9/10
[52] U.S. Cl. .................... 92/168; 91/376 R; 277/166; 277/208
[58] Field of Search .......... 91/165 R, 168, 376 R; 277/166, 178, 207 R, 208

[56] References Cited

U.S. PATENT DOCUMENTS

| | | | |
|---|---|---|---|
| Re. 28,191 | 10/1974 | Kytta et al. | 92/168 X |
| 2,549,818 | 4/1951 | Joy | 92/168 X |
| 2,815,970 | 12/1957 | Wallace | 92/168 X |
| 4,407,184 | 10/1983 | Ando et al. | 91/376 R |
| 4,423,666 | 1/1984 | Ohmi | 92/168 |

FOREIGN PATENT DOCUMENTS

| | | | |
|---|---|---|---|
| 3229830 | 2/1984 | Fed. Rep. of Germany | 92/168 |
| 2075137 | 11/1981 | United Kingdom | 92/168 |

Primary Examiner—Robert E. Garrett
Assistant Examiner—Mark A. Williamson
Attorney, Agent, or Firm—Flynn, Thiel, Boutell & Tanis

[57] ABSTRACT

In a brake booster a seal unit is provided which maintains a shell hermetically sealed in particular, in a region where a valve body reciprocates with respect to the shell and which guides the valve body in sliding contact with the shell. A portion of a seal member disposed between the shell and the valve body which is in sliding contact with the valve body is supported by a retainer to function as a bearing.

5 Claims, 3 Drawing Sheets

BRAKE BOOSTER WITH A SEAL AND GUIDE UNIT

BACKGROUND OF THE INVENTION

The invention relates to a brake booster, in particular, to the construction of a seal unit which maintains an enclosed shell hermetically sealed while supporting a valve body (power piston) for reciprocating motion.

A conventional brake booster is schematically shown in FIG. 5 which illustrates a seal unit for slidably supporting a power piston with respect to a shell. Specifically, a shell 1 includes a cylindrical portion 2 which extends from its rear wall, followed by a portion 3 of a reduced diameter, which defines a step therebetween. The seal unit comprises an annular seal member 4, a bearing 5 and a resilient retainer 6 which are sequentially mounted inside the step. The seal unit 8 slidably supports a rear cylindrical portion 7 of a valve body (power piston) with respect to the shell 1 while maintaining the interior of the shell 1 hermetically sealed against the exterior.

With the conventional arrangement described above, the seal unit requires three components including the seal member 4, bearing 5 and retainer 6. To accommodate for the possibility that one of these components, for example, the bearing 5 may be missed, as a result of an oversight during the mounting operation, there is a proposal as disclosed in Japanese Laid-Open Utility Model Application No. 145,446/1984, for example, in which a metal fixture 9 is bonded to the seal member 4 and is a press fit into a rear shell 12 to thereby secure the seal member 4 in place, the seal member 4 thus functioning both as the bearing and the seal (see FIG. 6). However, in the arrangement of FIG. 6, since the seal member 4 bonded with the fixture 9 is mounted as a press fit into the rear shell 12, a certain precision is required in the size of the rear shell 12, the fixture 9 and the seal member 4 as they are manufactured, presenting a quality control effort or otherwise tending to present a quality which changes from product to product.

SUMMARY OF THE INVENTION

Accordingly, it is an object of the invention to simplify the construction of a seal unit in order to prevent any trouble during its assembly and to reduce the cost required.

Above object is accomplished by constructing a seal unit with a seal member which is fitted between the internal surface of a shell and tee external surface of a valve body, and with a retainer which engages the internal surface of the shell to hold the seal member, wit the retainer supporting a portion of the seal member which is in sliding contact with the valve body.

DESCRIPTION OF EMBODIMENT

Figure 1:
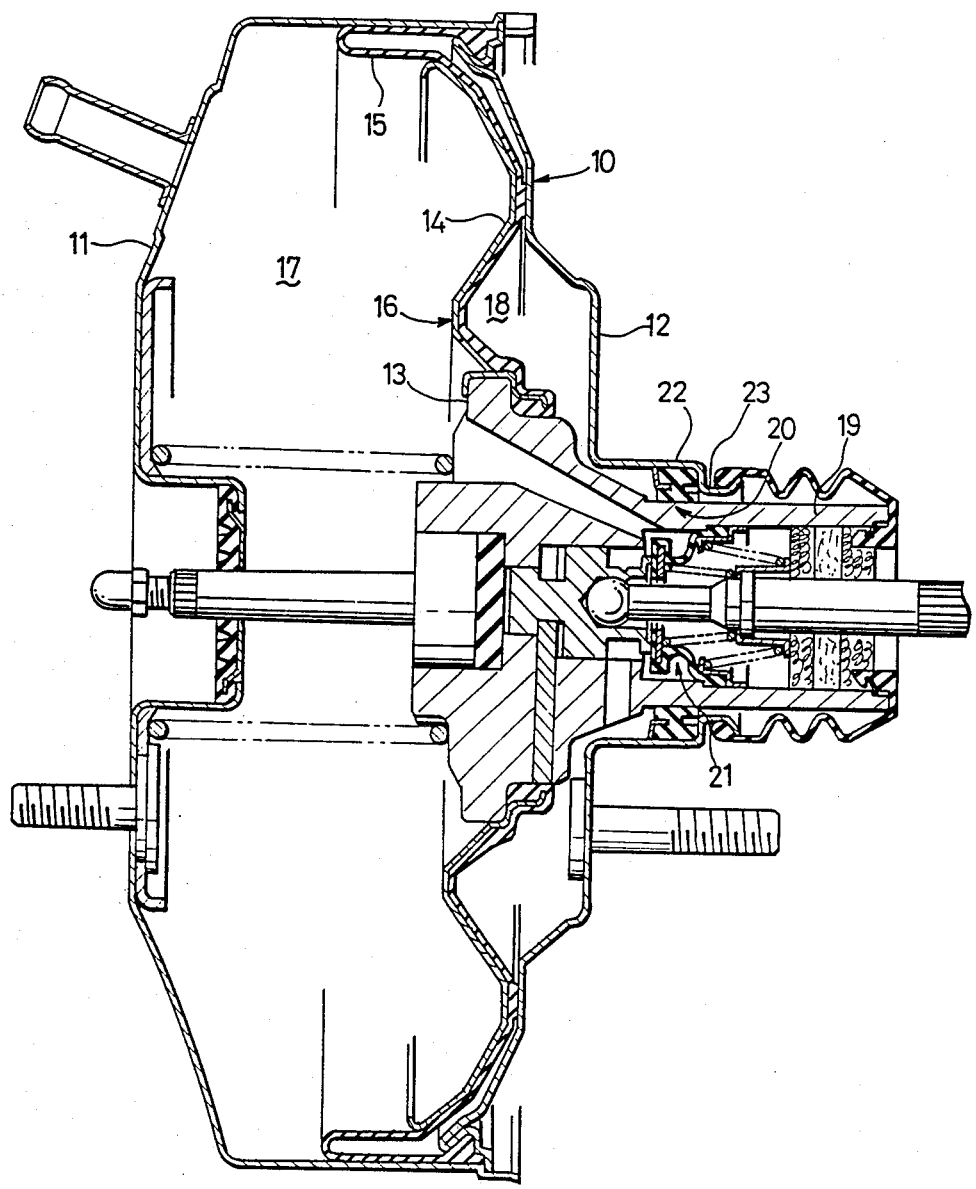
FIG. 1 is a longitudinal section of a brake booster according to an embodiment of the invention.
Figure 2:
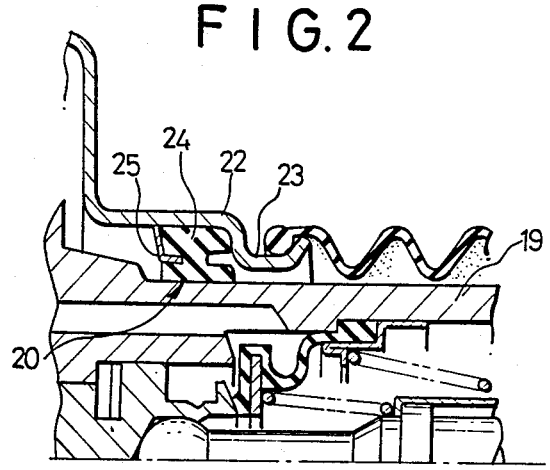
FIG. 2 is an enlarged section of a part thereof.

Referring to the drawings, an embodiment of the invention will now be described. In FIGS. 1 and 2, an enclosed shell 10 is defined by a front shell 11 and a rear shell 12, and the interior of the enclosed shell 10 is divided into a negative pressure chamber 17 which is maintained in connection with a source of negative pressure and an atmospheric chamber 18 by a combination of a valve body 13 disposed in alignment with the axis, a power piston 16 comprising a diaphragm plate 14 secured to the periphery of the valve body, and a diaphragm 15 which is carried by the back surface of the diaphragm plate 14. The valve body 13 includes a rearwardly extending cylindrical portion 19, and a seal unit 20 is disposed between the external surface of the cylindrical portion 19 and the internal surface of the rear shell 12 for maintaining the interior of the enclosed shell 10 hermetically sealed and for slidably supporting and guiding the cylindrical portion 19 of the valve body 13. The cylindrical portion 19 of the valve body 13 also contains a valve mechanism 21 which selectively connects the atmospheric chamber 18 with either the negative pressure chamber 17 or the atmosphere. Accordingly, as the valve mechanism 21 is operated by a braking action, the atmospheric pressure may be supplied to or displaced from the atmospheric chamber 18 to produce a differential pressure across the power piston 16, thereby achieving an intended booster action.

The rear shell 12 includes a cylindrical portion 22 which extends rearwardly from a central portion of the shell, followed by a portion 23 of a reduced diameter. The seal unit 20 is disposed inside the cylindrical portion 22 and is arranged for abutment against a step defined between the portions 22 and 23.

Figure 3:
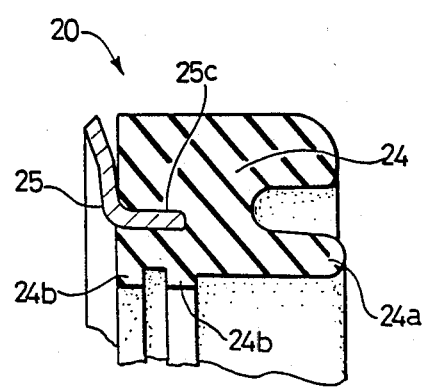
FIG. 3 is an enlarged cross section of a seal member engaged with an annular retainer prior to its assembly.
Figure 4:
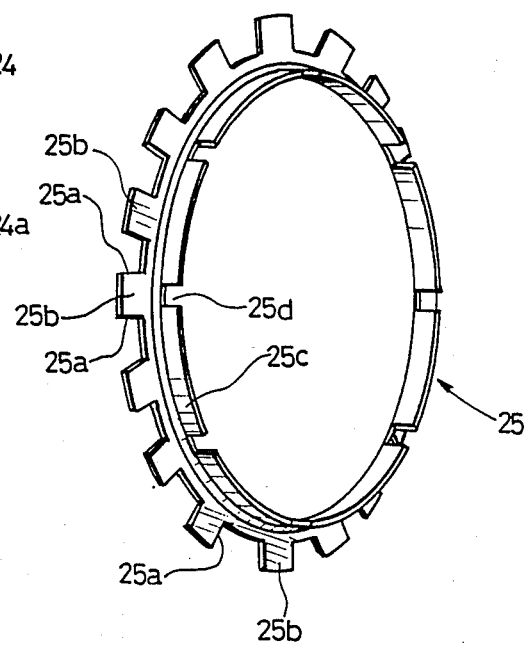
FIG. 4 is a perspective view of the annular retainer.

The seal unit 20 comprises a seal member 24 and an annular retainer 25. As shown in FIG. 3, the seal member 24 comprises an annular resilient member, the inner surface of which is formed with a seal lip 24a and a pair of inwardly extending annular ribs 24b. The annular ribs 24b define a bearing which guide the valve body 13 for reciprocating motion. As shown in FIG. 4, the retainer 25 comprises a resilient metal sheet, the outer periphery of which is alternately formed with notches 25a and tabs 25b at an equal interval while the inner periphery is formed with a cylindrical portion 25c which is folded to extend axially or in a direction parallel to the cylindrical portion 19 of the valve body 13. By inserting the cylindrical portion 25c into the side of the seal member 24 to support the bearing portion or the portion formed with the annular ribs 24b from the inside while the tabs 25b disposed around the outer periphery of the retainer 25 is disposed in resilient abutment against the internal surface of the cylindrical portion 22 of the rear shell 12 so as to be held in place, whereby the retainer 25 is effective to hold the seal member 24 in place. The annular retainer 25 is normally formed of spring steel to provide a firm holding action which maintains the seal member 24 in place within the cylindrical portion 22. However, when spring steel or other material which exhibits a poor drawing response is employed, notches 25d may be formed in the cylindrical portion 25c as shown in FIG. 4 to improve its molding response, but the configuration is not limited to one shown in the drawing.

Figure 5:
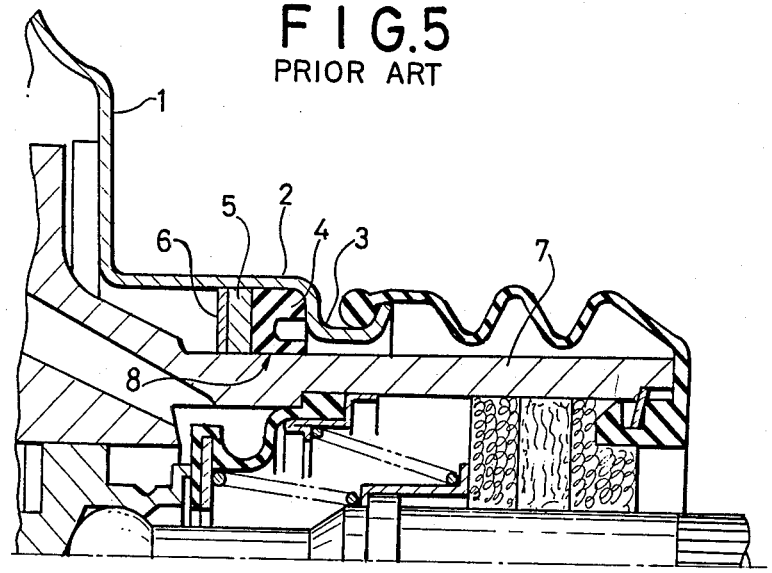
FIGS. 5 and 6 are cross sections of part of a conventional arrangement which corresponds to the portion shown in FIG. 2.
Figure 6:
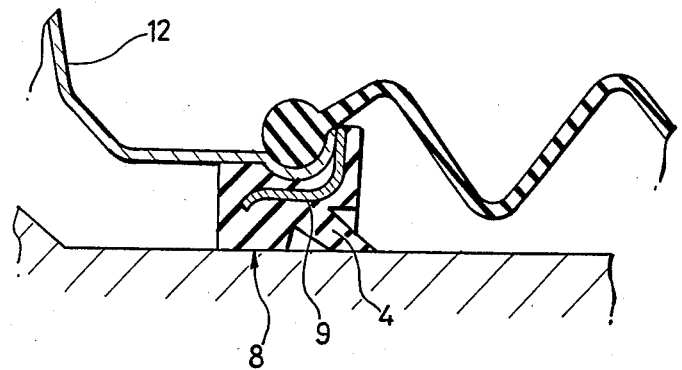

As a result of the described arrangement in which the cylindrical portion 25c of the annular retainer 25 which may be formed of spring steel or the like is inserted into the seal member 24 to hold it and the tabs 25b disposed around the outer periphery of the retainer are maintained in resilient abutment against the internal surface of the rear shell 12, the seal member 24 can be firmly maintained in place within the cylindrical portion 23. Since the axially extending cylindrical portion 55c of the annular retainer 25 bears against the back surface of the annular ribs 24b of the seal member 24 for contact with the valve body 13, the seal member 24, which is formed of an elastomeric material such as rubber, exercises a bearing function in addition to the sealing function, whereby it is capable of slidably guiding the rear cylindrical portion 19 of the power piston 16 for a precise stroking movement which is aligned with the axis thereof. In this manner, the invention enables a number of parts used to be reduced and hence the cost reduced as compared with a conventional arrangement shown in FIG. 5 while avoiding the likelihood of any missing parts during the assembly of the seal unit 20 and while avoiding the troublesome quality control which may be required for manufacturing a seal unit as shown in FIG. 6, thus contributing to an improved stabilization of the quality.

The seal member 24 may be formed of another elastomeric material other than rubber.

While the invention has been described above in connection with an embodiment thereof, it should be understood that a number of changes, modifications and substitutions therein will readily occur to one skilled in the art without departing from the spirit and scope of the invention defined by the appended claims.

What is claimed is:

1. A brake booster including a shell having its interior divided into a plurality of pressure chambers, a valve body internally housing a valve mechanism which controls a communication between the pressure chambers and between the pressure chambers and the atmosphere, and a seal unit disposed within the shell for maintaining the interior thereof hermetically sealed against the exterior thereof and for supporting the valve body for reciprocating motion, the seal unit comprising a seal member fitted between the internal surface of the shell and the external surface of the valve body, the seal member including a seal lip and a bearing portion, which are formed on the internal surface of an annular resilient member, and a retainer locked to the internal surface of the shell for holding the seal member, the retainer comprising an outer peripheral flange and an inner peripheral flange which in cross-section are bent substantially at a right angle with respect to one another, the inner peripheral flange of the retainer being formed as a cylinder extending in the direction of reciprocating motion of the valve body, the cylinder being axially inserted into the seal member for supporting the latter for sliding contact with valve body, said cylinder being axially inserted in said seal member at or radially inboard of the radially central portion of said seal member, so that not more than half the radial thickness of said seal member is radially surrounded by said cylinder, said cylinder thus extending parallel to the external surface of said valve body, said cylinder along its length evenly radially bearing against the back surface of said bearing portion of the seal member to enable said bearing portion to perform a bearing function in axially slidably guiding contact with the valve body, the retainer including a locking portion around its outer peripheral flange, which locking portion is in resilient engagement with and locked in abutment against the internal surface of the shell so as to restrict axial movement of said retainer with respect to said shell.

2. A brake booster according to claim 1 in which the bearing portion of the seal member comprises at least one radially inwardly extending annular rib, said cylinder being of sufficient axial extent to lie radially outward of, and radially back, each said rib.

3. A brake booster according to claim 1 in which the cylinder of the retainer is formed with notches.

4. A brake booster according to claim 1 in which the seal member has a first radial face which faces said retainer, said first radial face of said seal member having a concentric rectangular section recess facing said retainer and snugly receiving said cylinder of said retainer therein, the free edge of said cylinder facing axially toward and axially abutting the blind end of said recess, the bearing position of said seal member comprising at least one annular rib extending radially inward beyond said seal lip, said cylinder extending axially less than half the axial extent of said seal member and entering said recess from one side of said seal member, said cylinder radially surrounding said at least one rib, said ribs being axially substantially confined to the axial portion of the seal member carrying said at least one rib, said cylinder bearing against the back surface of said at least one rib to enable said at least one rib to exercise a bearing function in addition to a sealing function, so as to slidably guide axial reciprocation of the valve body therethrough.

5. A brake booster including a shell having its interior divided into a plurality of pressure chambers, a valve body internally housing a valve mechanism which controls communication between the pressure chambers and between the pressure chambers and the atmosphere, and a seal unit disposed within the shell for maintaining the interior thereof hermetically sealed against the exterior thereof and for supporting the valve body for reciprocating motion, the seal unit comprising a seal member fitted between the internal surface of the shell and the external surface of the valve body, the cross section of said seal member being of radial thickness less than axial width, said seal member having a rectangular cross section recess extending axially and opening toward the interior of said shell, said recess being in the radially inner half of the cross section of said seal member, said seal member having a radially inner wall and annular ribs protruding radially inward beyond said radially inner wall and bearing against said valve body, said ribs being surrounded by said axial recess, an annular retainer of substantially L-shaped cross section consisting of a substantially radial flange and an axial flange defining a cylinder extending in an exterior direction from the radially inner end of said radial flange, said cylinder being radially snugly received in said recess, said cylinder radially backing ribs and therewith enabling said seal member to act as a bearing for guiding axial movement of said valve body with respect to said shell, said radial flange having an outer periphery jammed against the interior surface of said shell to frictionally axially fix said seal member.

* * * * *